United States Patent Office 3,167,388
Patented Jan. 26, 1965

3,167,388
MASSIVE CRYSTALS OF $U_3O_8$
Donald E. Rhodes, Joplin, Mo., assignor, by mesne assignments, to Kerr-McGee Oil Industries, Inc., Oklahoma City, Okla., a corporation of Delaware
No Drawing. Filed Apr. 26, 1961, Ser. No. 105,574
12 Claims. (Cl. 23—14.5)

This invention relates to the preparation of a crystalline nuclear fuel material, and more particularly to the preparation of massive crystals of $U_3O_8$.

In certain nuclear fuels such as the aluminum cermets, it is quite desirable, and many times considered essential, that the uranium fuel of the cermet be in the form of $U_3O_8$, rather than any of the other derivatives of uranium such as $UO_2$, $UO_3$, $UO_4$, UC, $UC_2$. It has been found that $U_3O_8$ is the least reactive of the conventional uranium fuels with the parent element, particularly when such parent element is aluminum. The metal in a cermet serves as a conductor of heat away from the center of the element, thereby achieving greater efficiency and longer fuel element life. When $U_3O_8$ is the uranium compound in the cermet, it has also been found that there is a distinct advantage in having the $U_3O_8$ in the form of massive crystals of thirty microns or more, rather than the finely divided crystals of about one micron of the prior art $U_3O_8$. The massive, highly rigid crystals of this invention retain a major portion of the fission gases, krypton and xenon which are released when the uranium undergoes nuclear fission. However, the extremely small crystals of the prior art do not retain as great an amount of such fission gases. Fission takes place closer to the surface of the crystals of the prior art, due to their smaller size and finely particulated form; therefore, the gases can more easily escape from the crystals. The retention of fission gases is a very imporatnt feature in fuel element manufacture because these gases, if not confined in the nuclear material, can lead to excessive internal pressure in the fuel element, possibly causing it to rupture, with grave consequences to the reactor system and the personnel operating the reactor, if the fission products are released to the atmosphere.

The present invention provides a method of preparing a large crystalline $U_3O_8$, for incorporation into fuel elements, which will have fission gas retention properties sufficient to allow long burn-up approaching 20,000 megawatt days per ton of irradiated uranium. When a fuel element is manufactured from a material that will not retain the fission gases, the fuel life inside of the reactor is limited to that period of time at which the internal pressure of the fission gases approaches the material strength of element cladding. The property of massive crystals of crystalline $U_3O_8$ in retaining fission products offers a substantial economic advantage, for this particular fuel element, in contrast to the type which uses the finely divided, small crystal $U_3O_8$ of the prior art as the uranium fuel material. The prior art material is readily produced by heating an oxide of uranium in air to a temperature above about 500° C. If this heating is continued above about 1150° C., the $U_3O_8$ decomposes into a ceramic grade $UO_2$ and oxygen. If the heating is continued to the melting temperature of the $UO_2$, large stable crystals of $UO_2$ are formed upon cooling the molten $UO_2$ to room temperature in a non-oxidizing atmosphere. The crystals of $UO_2$ have a size of at least ten thousand microns.

Uranium and oxygen form a series of compounds ranging from $UO_4$ to UO. Of this series the better known compounds are $UO_4$, $UO_3$, $U_3O_8$, and $UO_2$. Most of these compounds are not stoichiometric, and have a small excess or deficiency of oxygen. The oxide compositions between the range of $UO_4$ and $UO_2$ have been extensively studied. It has been shown by numerous workers in the field that these various oxides are in equilibrium with their adjacent oxides, depending upon pressure and temperature, to establish the particular oxide form which is stable. The accepted high temperature stable form of uranium-oxygen system is $UO_2$, which is stable well above the melting point that is variously reported between 2100° C. and 2800° C. The stable form of uranim-oxide at room temperature is $U_3O_8$. Although the other oxides, $UO_2$, $UO_3$, and $UO_4$ may be prepared and observed at room temperature, all of these forms, given sufficient time, will be converted to $U_3O_8$ when equilibrium between these various oxides and the atmosphere is finally achieved. If $UO_4$, the most highly oxidized uranium oxide compound mentioned above, is heated to approximately 300° to 350° C., it will decompose rapidly into $UO_3$, with the release of oxygen. If the heating is continued, the $UO_3$ will decompose at about 500° C. to $U_3O_8$. This material is composed of small crystals in the form of a finely divided powder of about one micron size and when used as a reactor fuel is not capable of retaining the fission gases to any great degree. If an attempt is made to make the large crystalline form of $U_3O_8$ by fusing it at its melting temperature, it will be found that at approximately 1200° C. the $U_3O_8$ spontaneously decomposes to produce a ceramic grade of $UO_2$ and oxygen. It is therefore impossible to melt, under ambient pressure and oxygen pressure, $UO_4$, $UO_3$, and $U_3O_8$ in order to produce a large crystal form of $U_3O_8$.

Accordingly, by this invention is provided a process of providing massive crystals of $U_3O_8$ which comprises heating a uranium oxide or a uranium compound oxidizable to uranium oxide to a temperature sufficient to form a melt of $UO_2$, cooling the melt of $UO_2$ to a temperature in the range of about 950° to about 1150° C., and maintaining said $UO_2$ within said temperature range of about 950° to about 1150° C., whereby said $UO_2$ is converted to massive, highly pure crystals of $U_3O_8$. Alternatively, large crystals of $U_3O_8$ may be made from $UO_2$ formed from a molten mass of $UO_2$ which is cooled to room temperature under controlled conditions so as to form large crystals of $UO_2$, and then heated to the equilibrium temperature to form massive crystals of $U_3O_8$.

The starting material must be of sufficient purity to permit the formation of the large crystals of crystalline $UO_2$. Normally a highly purified starting material will be used in order to be certain that the final product will have the required purity for use in a reactor; however, there is a certain amount of purification when the starting material is heated to melting temperature due to the evolution of gaseous impurities. When heating the large crystal $UO_2$ to 950° to 1150° C. it is important, in order to minimize oxidation at the lower temperature, to either rapidly raise the temperature of the crystals to the equilibrium temperature when heating in an oxidizing atmosphere, or to heat in a non-oxidizing atmosphere.

In addition to the various oxides of uranium, other suitable starting materials are uranyl nitrate, uranyl sulphate and ammonium diuranate. The addition of oxygen from the atmosphere into the $UO_2$ crystal lattice proceeds slowly enough in the 950° C. to about 1150° C. temperature range so as not to destroy the original crystal size of the $UO_2$. If the addition of oxygen to the crystalline $UO_2$ is attempted at a lower temperature, the resultant $U_3O_8$ is the small crystal material described above. If attempted at a higher temperature, any $U_3O_8$ that is formed decomposes into finely divided crystals of $UO_2$ and oxygen.

A typical example of the process of this invention is as follows: A uranium oxide of composition between $UO_2$ and $UO_4$ was melted to produce a substantially all stoichiometric $UO_2$ at a temperature above 2200° C. The molten mass was allowed to solidify by cooling in a non-oxidizing atmosphere to room temperature.

This crystalline $UO_2$ was then subdivided to approximately six thousand micron size and introduced as a thin layer of approximately two inches into a furnace operating at 1100° C. The furnace was open to the surrounding atmosphere. Under these conditions the equilibrium between $U_3O_8$ and $UO_2$ was allowed to come to completion with the formation of $U_3O_8$ crystals approximating the original size of the $UO_2$ crystals which were introduced into the furnace. Following completion of the equilibrium, which required approximately five hours, the material was withdrawn and allowed to cool in air. The final product had a water immersion density of 8.27 g./cc., a uranium content of 84.81%, and a particle size of two thousand to five thousand microns.

The size of the subdivided crystals is not critical and a satisfactory particle size is from about 3,000 microns to about 13,000 microns; however, if they are too large they take longer to reach equilibrium. Neither is the thickness of the bed of uranium dioxide in the furnace a critical feature; however, as the thickness of the bed is increased, the time required to reach equilibrium is increased.

Any type of furnace that will maintain the bed of oxide at the required temperature and allow the oxide to come into equilibrium with the atmosphere is suitable. It may be advisable to enrich the atmosphere with additional oxygen when the furnace is the type that creates an atmosphere in contact with the oxide that is sufficiently deficient in oxygen.

Another example of this invention to form large crystals of $U_3O_8$ is as follows: $UO_2$ crystals of approximately six thousand micron size were prepared as described in the preceding example and placed in a gas-tight retort. A protective atmosphere of argon was introduced into the retort to displace all the air contained therein. The retort was then introduced into a furnace operating at a temperature of 1100° C. and the contents allowed to come to thermal equilibrium while maintaining the argon atmosphere over the $UO_2$ crystals. After reaching thermal equilibrium, one percent by volume of air was admixed with the argon circulating through the retort to slowly oxidize the $UO_2$ crystals to $U_3O_8$. Crystals of $U_3O_8$ formed by this technique were approximately the same size as the original $UO_2$, indicating that only a minor degree of fracturing of the $UO_2$ crystals occurred because of thermal shock and/or crystal lattice reformation.

The degree of fracture, and therefore the size of the $U_3O_8$ crystal compared with the size of the $UO_2$ feed material, is greater in the first example. This is because the feed material was inserted directly into the furnace at room temperature. During the temperature rise the feed $UO_2$ reacted with the oxygen in the atmosphere of the furnace and caused rupture of a portion of the feed. In the second example the temperature rise to furnace temperature took place in a non-oxidizing atmosphere, thereby allowing oxidation of all of the feed to take place in the desired temperature range of 950° to 1150° C.

The crystalline $U_3O_8$ prepared by the method described herein is used in fuel elements by first grinding and screening the crystalline $U_3O_8$ to produce a material with a particle size range of between forty and four hundred microns. This is the preferred particle size for the preparation of cermet fuel elements since it can retain the fission gases because the crystal dimensions are larger than most fission atom recoil path lengths, and still gives a dense, low surface area, easily handled material. The $U_3O_8$ is then mixed with aluminum powder so as to form a mixture containing approximately six percent uranium. This mixture is then compacted under high pressure and introduced into an aluminum cladding, followed by rolling or extrusion to achieve final shape of the fuel element.

The temperature at which the large crystals of $UO_2$ are converted to large crystals of $U_3O_8$ is dependent upon the partial pressure of the oxidizing medium and the length of time the $UO_2$ is placed in the furnace. At temperatures less than 950° to 1150° C. the partial pressure has to be reduced; otherwise the small crystal $U_3O_8$ of the prior art is produced. The time necessary to increase the conversion is greatly increased. Heating large crystals of $UO_2$ at temperatures above 1150° C. under higher than atmospheric partial pressures of oxygen will permit conversion to the large crystals of $U_3O_8$. It is to be noted that outside of the 950° C. to 1150° C. temperature range, a vacuum or pressure system is necessary.

Variations and modifications may be made within the scope of the claims without departing from the spirit and scope thereof.

What is claimed is:

1. The process of producing massive crystals of $U_3O_8$ comprising melting a compound of uranium to form a molten mass, maintaining said molten mass at a temperature and for a period of time whereby it is substantially all converted to stoichiometric $UO_2$, cooling to a temperature in the range of about 950° to about 1150° C. under conditions such that the composition of said stoichiometric $UO_2$ is retained, and oxidizing the said stoichiometric $UO_2$ while maintaining said temperature range until the said stoichiometric $UO_2$ oxidizes to $U_3O_8$, said $U_3O_8$ being in a massive crystalline form.

2. The process of claim 1 wherein the starting compound of uranium is an oxide of uranium.

3. The process of claim 1 wherein the starting compound of uranium is a ceramic grade of $UO_2$.

4. The process of claim 1 wherein the temperature employed in maintaining the molten mass is above 2200° C.

5. The process of claim 1 wherein the starting compound of uranium is an oxide of uranium and the temperature employed in maintaining the molten mass is above 2200° C.

6. The process of producing massive crystals of $U_3O_8$ comprising melting a compound of uranium to form a molten mass, maintaining said molten mass at a temperature and for a period of time wherein it is substantially all converted to stoichiometric $UO_2$, cooling the said stoichiometric $UO_2$ in a non-oxidizing atmosphere to room temperature so as to form large crystals of stoichiometric $UO_2$, and oxidizing the said stoichiometric $UO_2$ crystals while maintaining a temperature in the range of about 950° to about 1150° C. until the large crystals of stoichiometric $UO_2$ are oxidized to $U_3O_8$, said $U_3O_8$ being in massive crystalline form.

7. The process of claim 6 wherein the large crystals of $UO_2$ are subdivided prior to oxidation to about the same size as the final product.

8. The process of producing crystals of $U_3O_8$ comprising melting a compound of uranium, maintaining the molten mass at a temperature above 2200° C. until it is substantially all stoichiometric $UO_2$, cooling the said stoichiometric $UO_2$ to room temperature in a non-oxidizing atmosphere to form crystals of stoichiometric $UO_2$, subdividing the crystals of said stoichiometric $UO_2$ so formed to a particle size of about 3,000 microns to about 13,000 microns, forming a layer of said stoichiometric $UO_2$ such subdivided crystals of approximately one inch to three inches in thickness, and heating said layer in an oxidizing atmosphere at a temperature in the range of about 950° to about 1150° C. and oxidizing the crystals of said stoichiometric $UO_2$ while maintaining a temperature in the said range until the said stoichiometric $UO_2$ oxidizes to $U_3O_8$, said $U_3O_8$ being in a massive crystalline form.

9. The process for producing massive crystals of $U_3O_8$ comprising oxidizing crystals of stoichiometric $UO_2$ while maintaining a temperature in a range of about 950° C. to about 1150° C. until the said stoichiometric $UO_2$ oxidizes to $U_3O_8$, said crystals of stoichiometric $UO_2$ being formed by cooling a melt of stoichiometric $UO_2$ under conditions such that the composition thereof is retained, said $U_3O_8$ being in a massive crystalline form.

10. The process of claim 9 wherein the $UO_2$ has a particle size of about 3,000 microns to about 13,000 microns at the time of oxidizing.

11. The process of claim 9 wherein the $UO_2$ is oxidized in an oxidizing atmosphere.

12. A nuclear reactor fuel element containing crystals of $U_3O_8$ having a minimum dimension of at least twenty-five microns, the said crystals of $U_3O_8$ being in a massive crystalline form and prepared by a process including oxidizing crystals of stoichiometric $UO_2$ while maintaining a temperature in a range of about 950° C. to about 1150° C. until the said stoichiometric $UO_2$ oxidizes to $U_3O_8$, said crystals of stoichiometric $UO_2$ being formed by cooling a melt of stoichiometric $UO_2$ under conditions such that the composition thereof is retained.

References Cited in the file of this patent

UNITED STATES PATENTS 2,805,473    Handwerk et al. _____ Sept. 10, 1957

OTHER REFERENCES

AEC Publication LA 1952, October 1955.
AEC Publication WAPD-PWR-PMM-904, December 1956, p. 13.
Metallurgy and Fuels, vol. V, 1957, p. 529.
Technology of $UO_2$, a Reactor Material, by Johnson et al., Ceramic Bulletin, vol. 36, No. 3, 1957, pp. 115 and 116 relied upon.
AEC Publication WAPD-184, September 1957, p. 42.
AEC Publication BMI 1175, March 1957, p. 3.
AEC Publication DP-430, December 1959, pp. 7 and 8 relied upon.
Uranium Production Technology, 1959, published by D. Van Nostrand Co., Inc., p. 75.

UNITED STATES PATENT OFFICE
CERTIFICATE OF CORRECTION

Patent No. 3,167,388                          January 26, 1965

Donald E. Rhodes

It is hereby certified that error appears in the above numbered patent requiring correction and that the said Letters Patent should read as corrected below.

Column 4, lines 61 and 62, strike out "13,000 microns, forming a layer of said stoichiometric $UO_2$ such subdivided crystals of approximately one inch" and insert instead -- 13,000 microns, forming a layer of such subdivided crystals of said stoichiometric $UO_2$ approximately one inch --.

Signed and sealed this 22nd day of June 1965.

(SEAL)
Attest:

ERNEST W. SWIDER                                  EDWARD J. BRENNER
Attesting Officer                                       Commissioner of Patents